(12) United States Patent
Guermoud et al.

(10) Patent No.: US 8,125,571 B2
(45) Date of Patent: Feb. 28, 2012

(54) VIDEO DATA PROCESSING MODULE FURNISHED WITH A CONFIGURABLE VIDEO PROCESSING UNIT WITH A SINGLE INPUT BUS

(75) Inventors: Hassane Guermoud, Pont Péan (FR); Emmanuel Jolly, Rennes (FR); Laurent Blondé, Thorigne-Fouillard (FR); Jonathan Kervec, Paimpont (FR)

(73) Assignee: Thomson Licensing, Issy-les-Moulineaux (FR)

( * ) Notice: Subject to any disclaimer, the term of this patent is extended or adjusted under 35 U.S.C. 154(b) by 579 days.

(21) Appl. No.: 12/313,891

(22) Filed: Nov. 25, 2008

(65) Prior Publication Data

US 2009/0150583 A1    Jun. 11, 2009

(30) Foreign Application Priority Data

Nov. 27, 2007    (EP) ..................... 0759352

(51) Int. Cl.
*H04N 7/167*    (2011.01)
*H04N 9/64*    (2006.01)

(52) U.S. Cl. ........ 348/719; 348/718; 348/720; 348/553; 348/552; 348/721; 710/100

(58) Field of Classification Search ................ 348/552, 348/719, 718, 720, 721, 715, 553; 710/104, 710/100; 345/537, 538, 555, 547
See application file for complete search history.

(56) References Cited

U.S. PATENT DOCUMENTS

| 5,497,498 | A | 3/1996 | Taylor | |
|---|---|---|---|---|
| 7,853,802 | B2 * | 12/2010 | Soda et al. | ................ 713/189 |
| 2003/0043142 | A1 | 3/2003 | Ishibashi | |

FOREIGN PATENT DOCUMENTS

| WO | WO 99/55088 | 10/1999 |
|---|---|---|
| WO | WO 01/58159 | 8/2001 |

OTHER PUBLICATIONS

Search Report, Jun. 24, 2008.

* cited by examiner

*Primary Examiner* — Jefferey Harold
*Assistant Examiner* — Jean W Desir
(74) *Attorney, Agent, or Firm* — Myers Wolin, LLC

(57) ABSTRACT

According to the invention, the video data to be processed and the configuration data are transferred to the module via one and the same data bus. These modules are advantageously chained in series on a common bus which transfers to each module both the configuration data and the video data to be processed. Preferably, dead time or "blanking" periods between two picture frames transmitted on this bus are used in order to insert the configuration data.

3 Claims, 3 Drawing Sheets

VIDEO DATA PROCESSING MODULE FURNISHED WITH A CONFIGURABLE VIDEO PROCESSING UNIT WITH A SINGLE INPUT BUS

This application claims the benefit, under 35 U.S.C. § 119, of European
Patent Application No. 0759352 filed Nov. 27, 2007.

BACKGROUND OF THE INVENTION

1. Field of the Invention

The invention relates to a video data processing module comprising:
a) a processing unit for processing video data according to a processing that can be configured by configuration data, which is capable of converting video data to be processed into video data processed according to a configured processing, which is itself furnished with:
- a video input for retrieving the said video data to be processed,
- a video output for supplying said processed video data,
- a configuration input for retrieving the said configuration data, b) an input bus capable of delivering an input data stream comprising the said video data to be processed,
c) an output bus capable of delivering an output data stream comprising the said processed video data.

2. Description of Prior Art

FIG. 44 of document U.S. Pat. No. 5,497,498 describes such a processing module: see in particular the passage between column 22, line 55 and column 24, line 20 of this document.

A disadvantage of this video processing module is that it requires different buses: for the video data on the one hand (OBUS and NBUS in FIG. 44—see column 3, lines 2-3 and 51), and for the configuration data on the other hand (MBUS and HBUS in FIG. 44—see column 3, lines 7-8 and 49-50). One object of the invention is to provide a video data processing module furnished with a common bus for transferring the video data and the configuration data.

SUMMARY OF THE INVENTION

Accordingly, the subject of the invention is a video data processing module comprising:
a) a processing unit for processing video data according to a processing that can be configured by configuration data, which is capable of converting video data to be processed into video data processed according to a configured processing, which is itself furnished with:
- a video input for retrieving the said video data to be processed,
- a video output for supplying said processed video data,
- a configuration input for retrieving the said configuration data, b) an input bus capable of delivering an input data stream comprising the said video data to be processed,
c) an output bus capable of delivering an output data stream comprising the said processed video data,
where:
- the said input bus is suitable for integrating the said configuration data into the said input data stream;
- the said processing module also comprises a control unit that is connected to the said input bus, that is capable of separating the video data to be processed and the configuration data in the input data stream delivered by the said input bus, that is connected to the video input of the said video processing unit in order to transmit the video data to be processed to this unit after separation in the said input data stream and that is connected to the configuration input of the said video processing unit in order to transmit the configuration data to this unit after separation in the said input data stream.

Since the processing can be configured by processing configuration data, this processing is not integrated in advance into the processing unit, as for example in document U.S.2003/043142 where the control data ("control information"), that are transmitted by the same bus as the video data, are used only to activate or not activate processing modules that are preinstalled in the processing unit. Preferably, the said video data to be processed being distributed in picture frames, the said input bus is suitable for integrating the said configuration data in "dead times", where each "dead time" lies between two successive picture frames.

Preferably, the video processing unit is a circuit, a network ("FPGA") or a controller. The control unit may be based on a microprocessor, a CPU ("Central Processing Unit") or a circuit of the PLD ("Programmable Logic Device"), CPLD ("Complex Programmable Logic Device") or DSP ("Digital Signal Processor") type.

The buses that deliver the data streams may be of the HD-SDI ("High Definition Serial Digital Interface") type, as defined for example according to the SMPTE standard 292M-1998; they may also be of the DVI ("Digital Video Interface") type, or else of the "Fibre Channel" type as for example defined by the technical committee T11 of the "InterNational Committee for Information Technology Standards" (IN-CITS).

A further subject of the invention is a video data processing system comprising a plurality of processing modules according to the invention that are placed in series and where, irrespective of the processing module if it is not the first of the series, the input bus of the said processing module corresponds to the output bus of the previous processing module of the series.

Thanks to this connecting in series of the modules of the system, all the data that leave the module via its output bus enter the next module of the series, provided that there is one. Preferably, the various modules are then connected via a single bus that is common to all the modules.

Preferably, the central processing unit of each module, except, if necessary, the last of the said series, is also capable of combining in one and the same data stream the video data processed by this module and the configuration data of the other modules that follow in the said series, and of injecting this stream of combined data into the output bus of the said module.

Preferably, the said processed video data being distributed in picture frames, the said combination is suitable for integrating the said configuration data in "dead times" where each "dead time" lies between two successive picture frames.

In summary, the invention relates to a video data processing module furnished with a configurable video processing unit. According to the invention, the video data to be processed and the configuration data are transferred to this module via one and the same data bus. These modules are advantageously chained in series on a common bus which transfers to each module both the configuration data and the video data to be processed. Preferably, dead time or "blanking" periods are used between two picture frames transmitted on this bus in order to insert the configuration data.

BRIEF DESCRIPTION OF THE DRAWINGS

The invention will be better understood on reading the following description given as a non-limiting example and with reference to the appended drawings in which.

DESCRIPTION OF THE PREFERRED EMBODIMENTS

Figure 1:
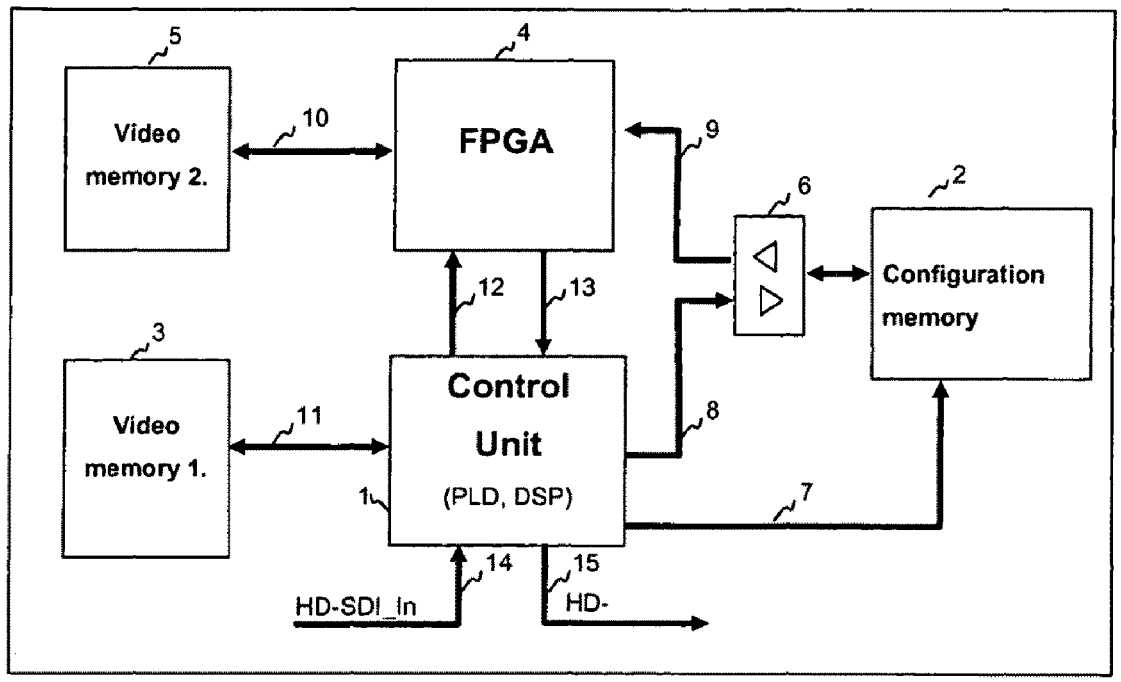
FIG. 1 illustrates the architecture of a processing module according to one embodiment of the invention.

With reference to FIG. 1, a video data processing module according to one embodiment of the invention will now be described. This module comprises:

- a video processing unit 4 of the FPGA ("Field Programmable Gate Array") type, furnished with a video input 12 in order to retrieve the video data to be processed, a video output 13 in order to supply the video data after processing, and a configuration input 9 in order to retrieve the configuration data. This video processing unit 4 is capable of converting the video data to be processed into video data processed according to a previously configured process. The video processing 4 is defined by configuration data that can be applied in a manner known per se to the FPGA.
- An input bus 14, of the HD-SDI type, capable of delivering an input data stream comprising the video data to be processed and, according to the invention, the configuration data, and an output bus 15, of the HD-SDI type, capable of delivering an output data stream comprising the processed video data.
- A control unit 1, of the "PLD" or "DSP" type, that is connected to the input bus 14, that is capable of separating the video data to be processed and the configuration data in the input data stream delivered by the input bus, which is connected to the video input 12 of the video processing unit 4 in order to transmit to this unit the video data to be processed after separation in the input data stream, and which is connected to the configuration input 9 of the video processing unit 4 in order to transmit to this unit the configuration data after separation in the input data stream. In a manner known per se, the control unit 1 is made capable of applying a sequencing which will be described later with reference to FIG. 3.

The video data processing module also comprises:

- a first video data memory 3 which is connected in a two-way manner to the control unit 1 by a first internal video data bus 11,
- a second video data memory 5 which is connected in a two-way manner to the video processing unit 4 by a second internal video data bus 10,
- a buffer 6 which connects the control unit 1 to the processing unit 4 for the transmission of the configuration data, and a configuration data memory 2 which is connected in a two-way manner to the buffer 6.

Figure 2:
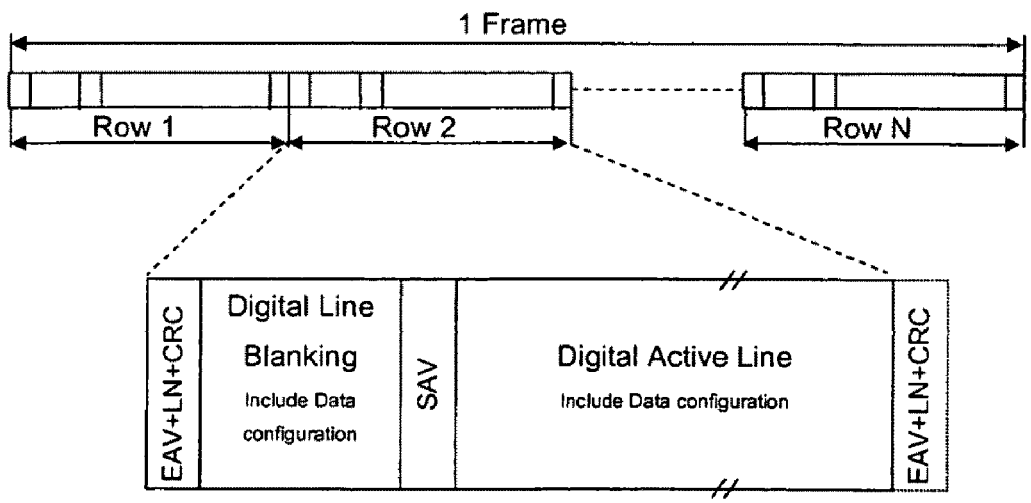
FIG. 2 illustrates an example of formatting of the data transferred by the bus, notably the input bus, of the processing module of FIG. 1.

An example of operation of the video processing module according to the embodiment of the invention that has just been described will now be described. With reference to FIG. 2, in a manner known per se, the configuration data are inserted into the video data to be processed in the data stream transferred by the input bus 14, while complying in particular with the following two HD-SDI standards:

- SMPTE 292M-1998: "Bit-Serial Digital Interface for High-Definition Television Systems", which defines the HD-SDI serial interface in which a slot is provided for the insertion of ancillary data, which will be used in this instance for inserting the configuration data.
- SMPTE 291M-2006: "Ancillary Data Packet and Space Formatting", which describes the format of these ancillary data which are in particular in this instance configuration data.

In FIG. 2, the acronyms SAV, EAV, LN and CRC have the following meanings:

SAV: "Start of Active Video"
EAV: "End of Active Video"
LN: "Line Number"
CRC: "Cyclic Redundancy Code".

Via the single input bus 14, the control unit 1 therefore receives a data stream comprising video data to be processed and configuration data that are suitable for configuring the video processing unit 4 in order to process these video data according to a processing defined, in particular, by these configuration data. The control unit 1 analyses this data stream according to the sequencing represented in FIG. 3:

- on the one hand, according to the left portion 16 of the flow chart, the control unit detects, in the data stream, the start ("SAV") and the end ("EAV") of each picture frame, and writes the data (see FIG. 2: "Digital Active Lines—Active Picture") situated between this start and this end in the first video memory 3, via the first video data internal bus 11, which makes it possible to store all the data of a picture in this memory.
- on the other hand, according to the right portion 17 of the flow chart, in the same data stream, the control unit searches (see the phase "Program file detection") for the possible presence of a configuration data file between the end ("EAV") of a frame and the start ("SAV") of a subsequent frame, that is to say in the phases called "blanking" or "dead time" of the data stream (see FIG. 2: "Digital Line Blanking—Ancillary data"); if such a file is detected, the configuration data of this file are written into the configuration memory 2 via the connection 8 and the buffer 6. The control unit 1 then initiates a configuration or reconfiguration phase of the processing unit 4 ("re-program phase") which involves the transfer of the configuration data from the file stored in the configuration memory 2 to the processing unit 4, via the buffer 6 and the configuration input 9. The control unit 1 then initializes the configuration phase of the processing unit 4 on the basis of the configuration data that have just been transferred to it ("End of re-program"). Then, as soon as the control unit 1 detects the end of the configuration phase of the processing unit 4, it repeats the detection phase (see the phase "Program file detection") of the possible presence of a configuration data file (see above).

The sequencing that has just been described with reference to FIG. 3 therefore comprises two concomitant processes: one 16 managing the writing of video data in the first video memory 3, and the other 17 managing the configuration of the processing unit 4 and the reading of the video data stored in the first video memory 3.

The control unit 1 analyses the stream of data transmitted by the single input bus 14 so as to detect therein the "blanking" or "dead time" phases and to extract therefrom the configuration data in order to store them in the configuration memory 2; in parallel, the video data are stored in the first video memory 3. When the control unit 1 detects the end of the configuration data, it then launches an initialization phase with the processing unit 4. The latter then downloads the configuration data stored in the configuration memory 2. After the configuration phase, the control unit 1 transfers the video data that have been delayed in the first video memory 3 to the processing unit 4. The processing unit 4 then processes these video data in real time and sends them processed to the processing unit 4 via a connection 13. The control unit 1 then transmits the processed video data to the output bus 15, after formatting according to the aforementioned HD-SDI standards.

Depending on the type of video processing carried out, the processing unit 4 may use the second video data memory 5 in order to stock the intermediate processing results therein.

Therefore, overall, the processing module according to the invention receives, via one and the same input bus 14, a video data stream to be processed and configuration data which are mixed, and restores a processed video data stream on an output bus 15.

The processing module is in this instance based on a video processing unit furnished with a programmable architecture FPGA. This processing module is suitable for analysing a data stream, in order to extract therefrom data of specific configuration of a video processing to be applied, and finally in order to configure itself so as to be able to apply this video processing. All of these operations are carried out without the processing being interrupted on the data stream. This is made possible thanks:

to the insertion of the configuration data in the horizontal and vertical blanking phases of the data stream. No video data is transmitted at this time in the stream.

to the hardware architecture of the processing module, which in particular comprises a control unit 4 which in this instance is associated both with a first video memory 3 and with a configuration memory 2. This architecture and the sequencing that has just been described make it possible to mask the configuration times of the processing unit 4.

Figure 4:
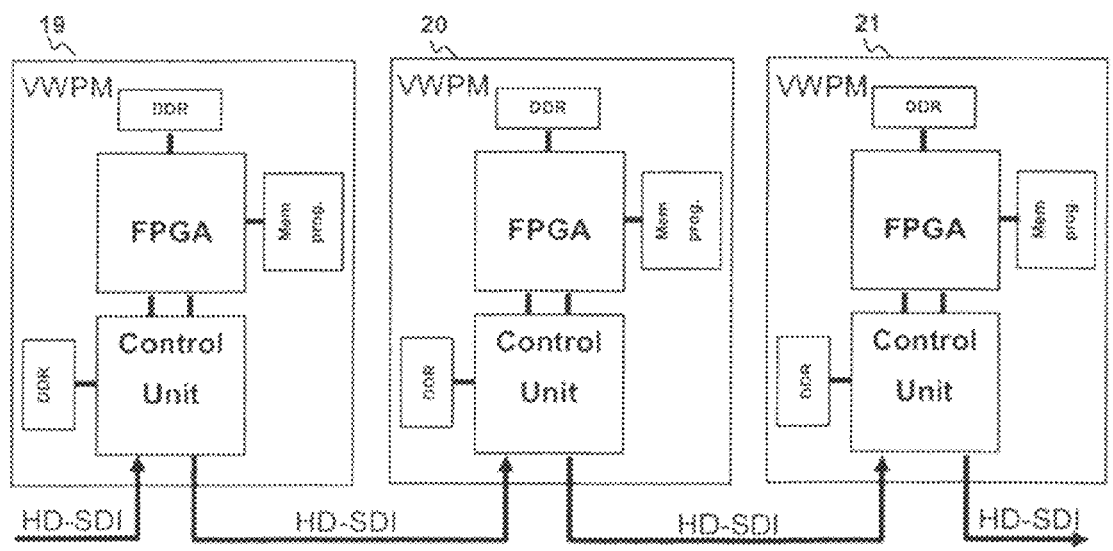
FIG. 4 illustrates the architecture of a processing system according to one embodiment of the invention, which comprises several processing modules according to FIG. 1.

Video processing modules like that which has just been described may advantageously be placed in series on a common and single data bus in order to form a video processing system according to the invention. Now will be described an embodiment of such a video processing system with reference to FIG. 4, which in this instance comprises three processing modules in series on a common and single bus of the HD-SDI type in the following order: a first processing module 19, a second processing module 20, and a third processing module 21.

Each processing module 19, 20, 21 is identical to the previously described processing module, except that the central unit of each module is also capable:

of combining in one and the same data stream the video data processed by this module and the configuration data of the other modules, particularly of the modules situated downstream in the series, and of injecting this stream of combined data into the output bus of the HD-SDI type of this module.

Figure 3:
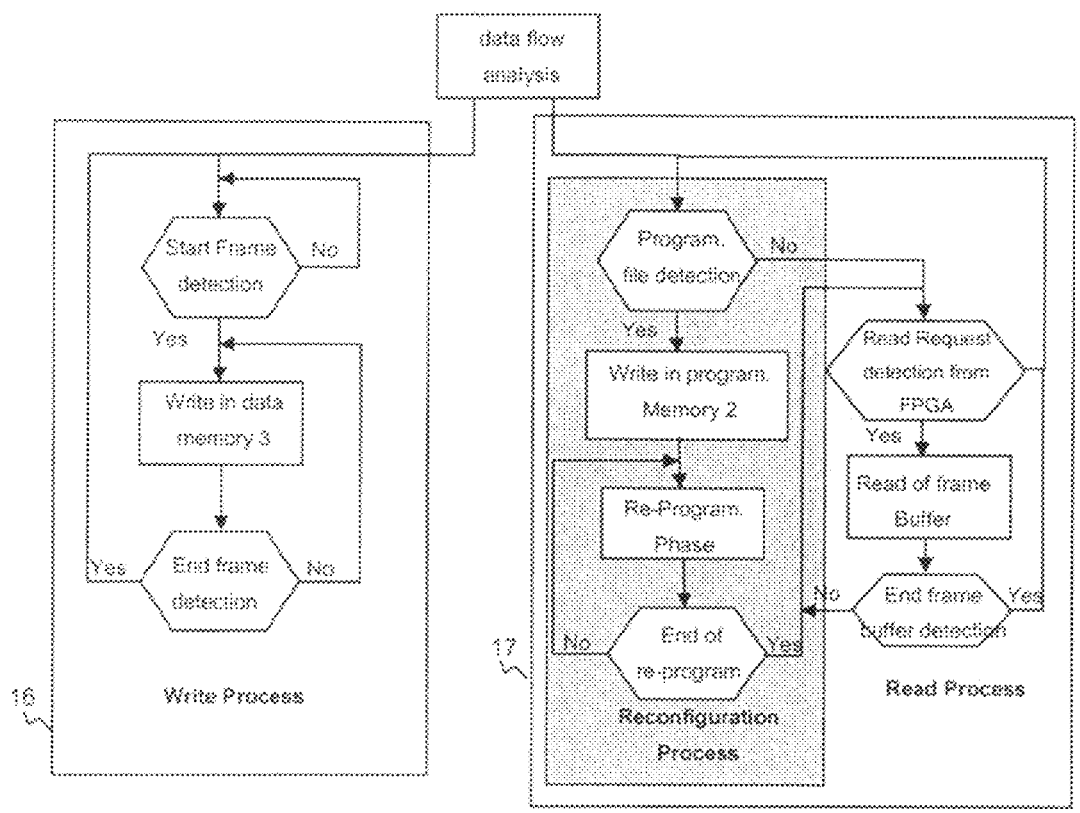
FIG. 3 illustrates an example of sequencing of control instructions of the control unit of the processing module of FIG. 1, in an exemplary embodiment of this module.

To make such a video processing system work, then preferably, in addition to the previously described phases of the sequencing of FIG. 3 that are applied then to each processing module 19, 20, 21, an initialization phase of the system is then provided during which an explicit token is inserted into the data stream transmitted by the common bus, which is suitable for identifying each processing module 19, 20, 21. Therefore each of the modules is then capable of identifying the configuration data that are sent specifically to it. The explicit token may consist of a 10-bit word whose value initially transmitted is for example set to 0x3FF. The first processing module 19 changes the value of the explicit token for example to 0x3FE. This new value is stored internally and becomes the address of the processing module 19. Then, this new token is transmitted to the next processing module 20 which changes it and stores it in its turn in order to become for example 0x3FD. The operation is repeated in this way up to the last processing module 21.

The following examples illustrate the invention.

Example 1

There now follows a description of three different methods of operating the video processing system that has just been described. In these three methods, it is assumed that the data transferred by the common HD-SDI bus of the processing system are formatted as described above with reference to FIG. 2.

Method 1:

This method assumes an initialization phase during which the first data of the stream transmitted by the common bus include no video data but configuration data defining the video processings to be applied to the pictures to be processed. A protocol previously described, based on an explicit token, allows each of the processing modules of the system to detect the configuration data sent to it, record them in its configuration memory and then launch the step of configuring its programmable programming unit of the FPGA type (reference 4 in FIG. 1). Once the processing units of the various modules have been configured, a data stream comprising the picture sequences that will then be processed in real time by the processing system according to the invention is sent to the common bus.

As an example, the size of a configuration file of one of the largest matrices of a processing unit of the FPGA type, of the Altera family (EP2S180), is 52.4 Mbits. Using the "single HD-SDI" link for the common bus, this gives a transfer time for the configuration data of the order of 20 ms. It is the equivalent of transferring half of a picture at a frequency of 24 Hz.

Method 2:

Each processing module of the processing system may be configured to apply a different video process depending on the sequence of pictures to be processed. This assumes that, during the initialization phase, each processing module has stored the various processes in its configuration memory in the form of specific configuration data. Then, to each sequence of pictures to be processed, a metadata (corresponding to a command word) will advantageously be added, capable of telling the various modules of the processing system which type of video processing they must apply and according to which configuration data they must reconfigure their processing unit of the FPGA type in order to apply this video processing. The command words will for example be transmitted on the common bus during a "blanking" period. Similarly, the reconfiguration of the processing units of the FPGA type must be carried out during this "blanking" phase. Advantageously this makes it possible to avoid interrupting the video processing and thereby provide real time processing. In this method, the configuration memory of each processing module should be large enough to store all the configuration data that will be used successively to program the processing unit of this module throughout the duration of the video stream.

It is then important to know two parameters in order to ensure real time video processing: on the one hand, the configuration time $T_{prog}$ of a processing unit of the FPGA type and on the other hand the "blanking" periods or "dead time" $T_{dead}$ in the data stream on the common bus. It is necessary to satisfy the relation: $T_{prog} < T_{dead}$. The following example is proposed.

The Case of the 2K 24 Hz 12 Bit Format per Colour Component:

The bandwidth available in a dual HD-SDI link (the link commonly used in post-production studios) is 3 Gbits/s.

The conventional bit rate of a 2K picture data stream at 24 Hz is 1.91 Gbits/s. From this, the blanking time or dead time $T_{dead}$ is deduced that could be used to program a processing unit of the FPGA type: 15 ms (the pixel frequency is 74.25 MHz). This means that the processing unit of the FPGA type which should then be used should have a configuration time of less than 15 ms. For a processing unit of the FPGA type, it is possible to choose for example the commercially listed FPGA circuit model Altera EP2S30. Overall, the dead time is expressed as follows:

$$T_{mort} = \frac{BW_{remaining}}{F_{pixel} * N_{bits} * F_{picture}}, \text{ where:}$$

$BW_{remaining}$: bandwidth remaining
$F_{pixel}$: pixel frequency, 74.25 MHz
$N_{bits}$: number of bits per triplet transmitted, 36 bits
$F_{picture}$: picture frequency, 24 Hz or 48 Hz Other Cases (2K Images at 48 Hz, and 4K Images at 24 Hz):

The bit rates for a data stream of 2K pictures at 48 Hz or 4K pictures at 24 Hz are respectively 3.82 Gbits/s and 7.64 Gbits/s. Two solutions are proposed to transfer, on the one hand, the picture and configuration data streams, and, on the other hand, to compensate for the configuration times of the circuits of the FPGA type:

First solution: increase the HD-SDI pair by moving to 2 pairs of HD-SDI link in the case of 2 K at 48 Hz and to 3 pairs in the case of 4 K at 24 Hz. The case 2 K at 48 Hz will therefore give a bandwidth of 6 Gbits/s (2 HD-SDI pairs) while the bit rate would be 3.82 Gbits/s. So the dead time for reconfiguring the FPGA circuit is of the order of 17 ms. The case of 4 K at 24 Hz will therefore have a bandwidth of 9 Gbits/s (3 HD-SDI pairs) while the bit rate would be 7.64 Gbits/s. So the dead time for reconfiguring the FPGA circuit is of the order of 21 ms.

Second Solution:

The second solution consists in applying a compression to the transmitted data stream. This therefore reduces the bit rate of the stream which makes it possible to generate more time for reconfiguration and use fewer pairs of HD-SDI links. This solution requires that each of the processing modules of the system is fitted with a decompression circuit at the input and a compression circuit at the output to the other modules of the chain of the processing system. In a digital cinema post-production environment, it is usually necessary for the quality of compression to be at least equal to that which is presented in the "DCI" specification (based on the "Jpeg2000" specification). As an example, the DCI specification requires, for all of the formats, after compression, a maximum bit rate of 250 Mbits/s. If a single HD-SDI link were used (bandwidth of 1.5 Gbits/s), this then gives a dead time necessary for the reconfiguration of the FPGA circuits of 19 ms in the case of 24 Hz and 9.5 ms for 48 Hz.

The post-production studios may demand stricter requirements than the DCI specification in terms of picture quality. This means less compression in order to keep a maximum of information for the processings applied to the pictures. In this case, it is possible to imagine a compromise between the HD-SDI link pair that may be used and the compression ratio of the pictures.

Method 3:

This method is an enhancement of method 2 described above. In order to make the configuration memory size of each processing module independent of the number of processings that will be carried out by the processing unit of the FPGA type of this module, the configuration memory size is limited to the storage size of a single processing. This method therefore requires downloading, during the initialization phase described above, a single configuration data file per processing module. As for method 2, a command word is set during the transmission of the "blanking" data in order to launch the configuration of the processing units of the FPGA type of each of the modules. The specific feature of method 3 consists in establishing that, during the execution of the first series of video processing, access to the configuration memories cannot be achieved without disrupting the operation of the various ongoing operations. This leads to again using the "blanking" times in order to send the second series of processings to the configuration memories of the processing modules and then, at the desired moment, sending the command words to launch the reconfiguration of the processing units of the FPGA type of each of the modules in order to execute the second series of video processings.

Example 2

The purpose of this example is to illustrate an exemplary application of a processing system according to the invention with a video processing called "post-production" video processing for digital cinema.

Figure 5:
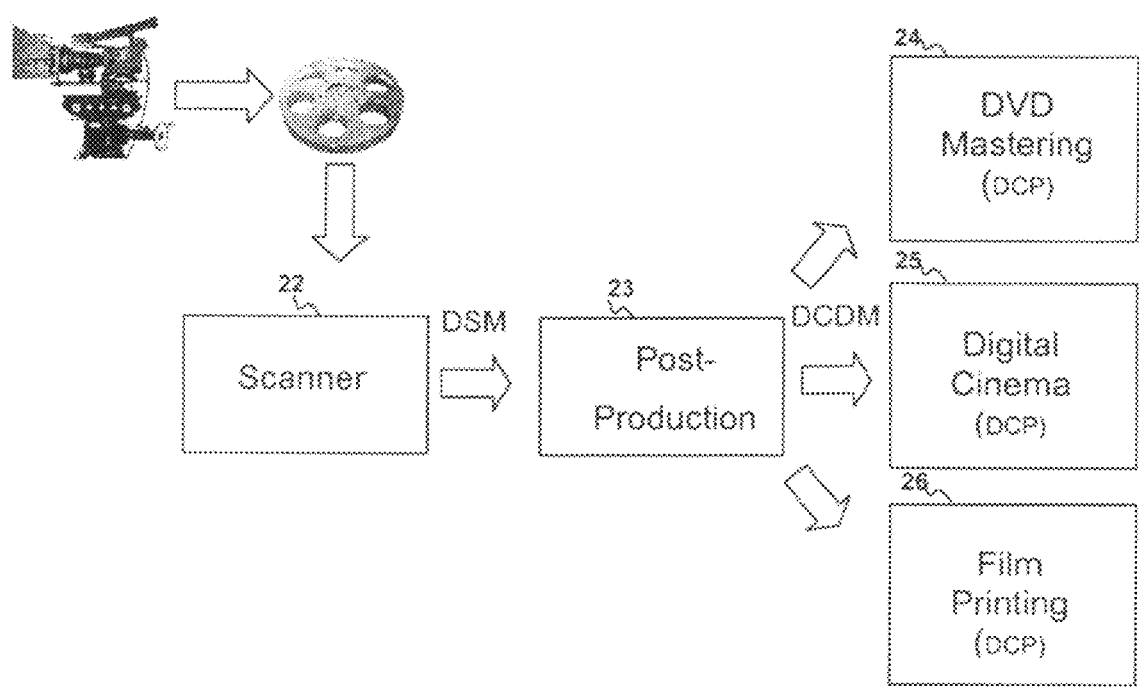
FIG. 5 illustrates the various steps of a cinematographic production method.

FIG. 5 illustrates various conventional steps of producing a cinema sequence based on films of shooting (at top left) in order to culminate in one and/or the other of the following final "products": DVD via a final step called "DVD mastering" 24, digital cinema via a final step of digital file editing 25 ("Digital Cinema"), or projection film via a final film printing step 26 ("Film Printing"). FIG. 5 clearly shows that the "post-production" step 23 lies between a "scanning" step 22 and one of the final steps 24, 25 or 26.

During the scanning step 22, the shooting film is scanned (step 22) into one or more video data files in DSM ("Digital Source Master") format. The post-production step 23 is designed to process these "DSM" format files in order to obtain one or more video data files processed in DCDM ("Digital Cinema Distribution Master") format, for the purpose of one or other of the final steps 24,25,26. The video processing is advantageously carried out with the aid of a processing system according to the invention. These video processings are adapted in a manner known per se in order to correct, for example, defects originating from the lighting conditions, originating from colour difference, originating from Gamma difference etc. Into these processed data files that are in DCDM format are inserted specifications of the data file that are uncompressed and unencrypted.

The "DCI" ("Digital Cinema Initiative") specification describes the following steps, particularly a data encryption and compression step which is carried out before distribution of the film. The result of this is a distribution file format called "DCP" ("Digital Cinema Package"). In the event of release in cinema auditoria (see step 25 in FIG. 5), the latter receive the films in DCP format. These auditoria are usually fitted with an apparatus of the "MB" (Media Block) type which is suitable for decrypting and decompressing the DCP format in order to extract video data which may be addressed to the digital projector via, for example, a link of the "dual" or "Quad HD-SDI" type. For further information, reference may be made to the "DCI" specification V1.0 of 20 Jul. 2005.

For post-production video processing with the aid of the processing system that has just been described, the picture formats used are for example those of the "DCI" ("Digital Cinema Initiative") standard, as shown in Table 1:

TABLE 1

| Container level | Horizontal pixels | Vertical pixels | Picture frequency (Hz) | Bits/ component | Bit rate (Gbits/s) |
|---|---|---|---|---|---|
| 1 | 4096 | 2160 | 24 | 12 | 7.64 |
| 2 | 2048 | 1080 | 48 | 12 | 3.82 |
| 3 | 2048 | 1080 | 24 | 12 | 1.91 |

In the single bus of the HD-SDI type of the processing system (see FIG. 4) according to the invention, each channel supports a bit rate of 1.5 Gbits/s (see the SMPTE 292M-1998 standard). The video processings are chained one after the other between the various processing modules 19, 20, 21 via a common video bus of the DUAL HD-SDI (4:4:4) type (see the SMPTE 372M-2002 standard), or via a video bus of the Quad HD-SDI type. The processings are carried out on the fly, hence in real time, that is to say that all the video processings are applied without interruption of the video data stream. The present invention has been described with reference to a particular processing module and to a processing system based on a chain of such modules. It is evident to those skilled in the art that it may apply to other types of processing modules and to other processing systems using the modules without departing from the context of the following claims.

The invention claimed is:

1. Video data processing module comprising:
a) a processing unit for processing video data, which are distributed in picture frames, according to a processing that can be configured by configuration data, which is capable of converting video data to be processed into video data processed according to a configured processing, which is itself furnished with:
   a video input for retrieving the video data to be processed,
   a video output for supplying said processed video data,
   a configuration input for retrieving the configuration data,
b) an input bus capable of delivering an input data stream comprising the video data to be processed and suitable for integrating the configuration data into the input data stream in "dead times" Nine between two successive picture frames of the video data,
c) an output bus capable of delivering an output data stream comprising the processed video data,
d) a control unit that is connected to the input bus, that is capable of separating the video data to be processed and the configuration data in the input data stream delivered by the input bus, that is connected to the video input of the video processing unit in order to transmit the video data to be processed to this unit after separation in the input data stream and that is connected to the configuration input of the video processing unit in order to transmit the configuration data to this unit after separation in the input data stream,
wherein the duration of configuration that is required to configure the processing unit according to said configured processing is inferior to the duration of the "dead times".

2. Video A video data processing system comprising:
a plurality of video processing modules placed in series;
each of the plurality of video processing modules comprising:
   a processing unit for processing video data, which are distributed in picture frames, according to a processing that can be configured by configuration data, which is capable of converting video data to be processed into video data processed according to a configured processing, which is itself furnished with:
      a video input for retrieving the video data to be processed,
      video output for supplying said processed video data,
      a configuration input for retrieving the configuration data;
   an input bus capable of delivering an input data stream comprising the video data to be processed and suitable for integrating the configuration data into the input data stream in "dead times" lying between two successive picture frames of the video data;
   an output bus capable of delivering an output data stream comprising the processed video data;
   a control unit that is connected to the input bus, that is capable of separating the video data to be processed and the configuration data in the input data stream delivered by the input bus, that is connected to the video input of the video processing unit in order to transmit the video data to be processed to this unit after separation in the input data stream and that is connected to the configuration input of the video processing unit in order to transmit the configuration data to this unit after separation in the input data stream,
wherein the duration of configuration that is required to configure the processing unit according to said configured processing is inferior to the duration of the "dead times" and wherein, irrespective of the video processing module if it is not the first of the series, the input bus of the processing module corresponds to the output bus of the previous processing module of the series.

3. Processing A processing system according to claim 2, wherein the central unit of each module, except, if necessary, the last of the series, is also capable of combining in one and the same data stream the video data processed by this module and the configuration data of the other modules that follow in the series, and of injecting this combined data stream into the output bus of the module.

* * * * *